US012795267B2

(12) United States Patent
Lea

(10) Patent No.: US 12,795,267 B2
(45) Date of Patent: Nov. 10, 2026

(54) OPTICAL SWITCH FABRICS FOR HIGH PERFORMANCE COMPUTING

(71) Applicant: Chin-Tau Lea, Mid Levels (HK)

(72) Inventor: Chin-Tau Lea, Mid Levels (HK)

( * ) Notice: Subject to any disclaimer, the term of this patent is extended or adjusted under 35 U.S.C. 154(b) by 78 days.

(21) Appl. No.: 18/386,192

(22) Filed: Nov. 1, 2023

(65) Prior Publication Data

US 2025/0142235 A1 May 1, 2025

(51) Int. Cl.
*H04Q 11/00* (2006.01)

(52) U.S. Cl.
CPC . *H04Q 11/0005* (2013.01); *H04Q 2011/0016* (2013.01); *H04Q 2011/0024* (2013.01)

(58) Field of Classification Search
CPC .................................................. H04Q 11/0005
See application file for complete search history.

(56) References Cited

U.S. PATENT DOCUMENTS 7,688,816 B2 3/2010 Park et al.
9,497,517 B2 11/2016 Lea
(Continued)

OTHER PUBLICATIONS

Ueda et al., "Large-Scale Optical Switch Utilizing Multistage Cyclic Arrayed-Waveguide", IEEE Photonics Journal, vol. 9, No. 1 2017 (Year: 2017).*
(Continued)

*Primary Examiner* — Shi K Li

(57) ABSTRACT

This invention is related to two-stage optical packet switch fabrics for TE (terabit Ethernet)-based HPCNs (high performance computing networks). The main features of the invented optical switch architecture are the following: (1) it can support thousands of TE links; (2) it has a low signal power loss and requires no optical amplifiers; (3) it can switch WDM packets simultaneously without using wavelength converters.

The patent application presents various embodiments of the two-stage switch architecture. In one embodiment, the first stage comprises K N×N (N inputs and N outputs) AWGs and the second stage comprises N K×K OSSes (optical space switches). This results in a port count of KN. Each input can transmit N wavelengths and a total of $KN^2$ packets can pass through the switch fabric simultaneously without blocking. The switch fabric is named AS for the technologies used in the two stages. Currently 32×32 AWGs are available. This allows an AS switch fabric to support more than a couple of thousands TE links easily.

In another embodiment, the first stage comprises N K×K OSSes and the second stage comprises K N×N AWGs. It is named SA for the same reason given above. Similar to the first embodiment, the total number of source and destination ports supported by an SA switch fabric equals KN, and $KN^2$ packets can be transmitted simultaneously through the switch fabric. All the features and advantages of the AS architecture are inherited by the SA architecture.

In still another embodiment, two AS or SA switch fabrics are used in parallel to construct a switching system capable of handling any kind of unbalanced traffic loads. A port processor for keeping a bounded delay, for processing and re-sequencing packets in such a switching system is also presented in this patent application.

3 Claims, 15 Drawing Sheets

(56) References Cited

U.S. PATENT DOCUMENTS

| | | | | |
|---|---|---|---|---|
| 10,499,125 | B2 | 12/2019 | Lea | |
| 10,630,819 | B2 | 4/2020 | Sammour et al. | |
| 2018/0167702 | A1* | 6/2018 | Lea .................... | H04Q 11/0005 |

OTHER PUBLICATIONS

Nagai et al., "Design and Verification of Large-Scale Optical Circuit Switch Using ULCF AWGs for Datacenter Application", Optical Communication Network, vol. 10, No. 7, OSA, Jul. 2018 (Year: 2018).*

* cited by examiner $\lambda_m^n$: wavelength $n$ from input $m$

OPTICAL SWITCH FABRICS FOR HIGH PERFORMANCE COMPUTING

TECHNICAL FIELD

The present invention pertains to AWG (arrayed waveguide gratings)-based optical switch fabrics that can switch WDM (Wavelength Division Multiplexed) packets simultaneously without the need for wavelength converters or optical amplifiers.

BACKGROUND

Due to the insatiable demand for bandwidth in AI computing and data processing, the upcoming Terabit Ethernet (TE) technology is set to become a critical component in the next-generation High-Performance Computing Networks (HPCNs) The size of AI models is rapidly increasing. GPT-4's training model, for instance, contains 1.76 trillion parameters. The training task requires a huge number of GPU/CPU cards and moving the training data between them can quickly lead to bottlenecks in the HPCN that interconnects these HPC (high performance computing) cards. This is why the TE technology will play a vital role in constructing the next-generation HPCNs for AI computing and deep learning. However, designing a switch fabric (e.g. 100 in FIG. 1) for such an HPCN is a challenging task. This is because each TE link carries tens of wavelengths, and using an electric switch fabric would require de-multiplexing WDM (wavelength division multiplexed) signals from each link into individual packets that would then be switched electronically, bit by bit. This approach is highly inefficient in terms of scalability, power consumption, and cost Therefore, to design a switch fabric for a TE-based HPCN, the focus should be on architectures and devices that can directly switch WDM packets in the optical domain. An N×N (N inputs and N outputs) AWG (also known as AWGR) is an ideal device for this task (see FIG. 2). It is a passive device consuming little or no power. Each input of the device can transmit N different wavelengths simultaneously, which are routed to N outputs without blocking. However, commercially available AWGs have a port count of only around 30, while a switch fabric for a HPCN may need to support more than a thousand TE links. The ASA switch architecture (C-T Lea, *ASA: A scalable optical switch*, U.S. Pat. No. 9,497,517, 2016 and C-T Lea, *A Scalable AWGR-Based Optical Switch*, IEEE Journal on Lightwave Technology, Vol 33, No 22, November 2015, pp. 4612-4621) tackles this issue by using a three-stage architecture as shown in FIG. 3. Its name is derived from the initials of the technologies used by the three stages: AWG, Space Switches (optical), and AWG. An ASA switch fabric adopts the topology of a well-known Benes network and can extend the total port count from N to $N^2$. The example in FIG. 3 is for N=5. Note that in an ASA switch fabric, only the middle-stage OSSes (optical space switches) are configurable and each OSS is controlled by an electronic scheduler (e.g. E-Sch in 320A-320E). These schedulers need to collect queuing information from port processors (e.g. 112A-112C) of HPC cards. Based on the collected information, the schedulers decide which ports are allowed to transmit in a given slot (i.e. cell transmission time). Permissions in the form of "grant tokens" also need to be sent back to port processors. However, constructing a network to interconnect port processors and schedulers can be as challenging as constructing the optical switch fabric itself. Furthermore, the ASA switch fabric has poor performance under certain unbalanced traffic loads. This is primarily due to the fact that the N wavelengths transmitted by an input of an AWG must be destined for N different outputs of the device Its throughput will drop significantly if all of them are headed to the same output.

The TASA (TDM-ASA) switch architecture was invented to address the aforementioned issues ("Chin-Tau Lea, TASA: A TDM ASA-based packet switch, U.S. Pat. No. 10,499,125, 2019") (refer to FIG. 4A). The only difference between a TASA switch fabric and an ASA fabric is that TASA's OSSes operate in a TDM (time division multiplexing) mode (refer to FIG. 4B). Connection patterns used by an OSS are stored in its memory, and the OSS reads out the connection pattern to set up its crosspoints in a TDM slot, eliminating the need for electronic schedulers to configure the switch. To tackle the unbalanced-traffic-loads issue, two TASA switch fabrics are utilized in tandem. The first TASA switch distributes incoming packets evenly to its output ports, resulting in a balanced traffic load for the second TASA switch. Although the TASA switch fabric has its merits, it still has two significant drawbacks (note: both drawbacks also exist in the ASA architecture). First, an optical signal has to pass through three stages of switching devices (A-S-A) before reaching its destination port, resulting in a significant power loss. The insertion loss of one AWG is around 5~8 dB and the loss of an OSS is much higher. The speed requirement (10 ns<) for OSSes limits the types of switching devices we can choose. For example, directional couplers made from Lithium Niobate ($LiNbO_3$) or PLZT (M Hayashitani et al, 10 *ns High-speed PLZT optical content distribution system having slot switch and GMPLS controller*, IEICE Electronics Express, Vol. 5, No. 6, 181-186, 2008.) have a switching time<10 ns. But the signal loss of an OSS made from this type OSSes is around 10~12 dB. The total power loss of the switch fabric (two AWGs and one OSS) alone can easily exceed the limit imposed by the receiver sensitivity requirement (~23 dB). Therefore, optical amplifiers 340A-340E and 440A-440E have to be deployed in an ASA or a TASA switch fabric. The cost of adding an optical amplifier to each fiber link can make the switch too expensive. Second, the AWG sizes used by ASA or TASA switch fabrics must be an odd number, but the sizes of all commercially available AWGs assume even numbers. This means that custom-made AWGs are required, which can also increase the implementation cost significantly.

This patent application describes two optical switch fabrics that eliminate these issues.

SUMMARY

The following is a summary of the invented optical packet switch fabrics for the upcoming TE (Terabit Ethernet)-HPCNs (high performance computing networks). The objectives of the invention are as follows. (1) the switch fabrics can handle thousands of TE links: (2) the switch fabrics have low signal power loss and do not require the use of optical amplifiers; and (3) the switch fabrics do not require wavelength converters or electronic schedulers To illustrate the design principle of the invention, various exemplary non-limiting embodiments are presented. In one embodiment, the first stage of the switch fabric comprises K N×N (N inputs and N outputs) AWGs, and the second stage contains N K×K OSSes (optical space switches). This results in a port count of KN, where K can be larger than N. The switch fabric is named AS, derived from the technologies (AWG and space switching) used in the two switching stages. Each input of the switch fabric can transmit N wavelengths simultaneously, and a total of $KN^2$ packets can traverse the switch without blocking. With today's technology, the switch fabric can easily support over a couple of thousand TE links.

In another embodiment, the first stage of the switch fabric contains N K×K OSSes (optical space switches), and the second stage K N×N AWGs. This switch fabric is named SA for the technologies used by the two switching stages. An SA switch fabric inherits all the features and benefits of an AS switch fabric.

In yet another embodiment, two AS (or SA) fabrics are used in parallel to construct a switching system capable of handling any kind of unbalanced traffic loads. Additionally, a port processor designed to process and re-sequence packets for such a switching system is invented in this patent application.

DETAILED DESCRIPTION

Figure 1:
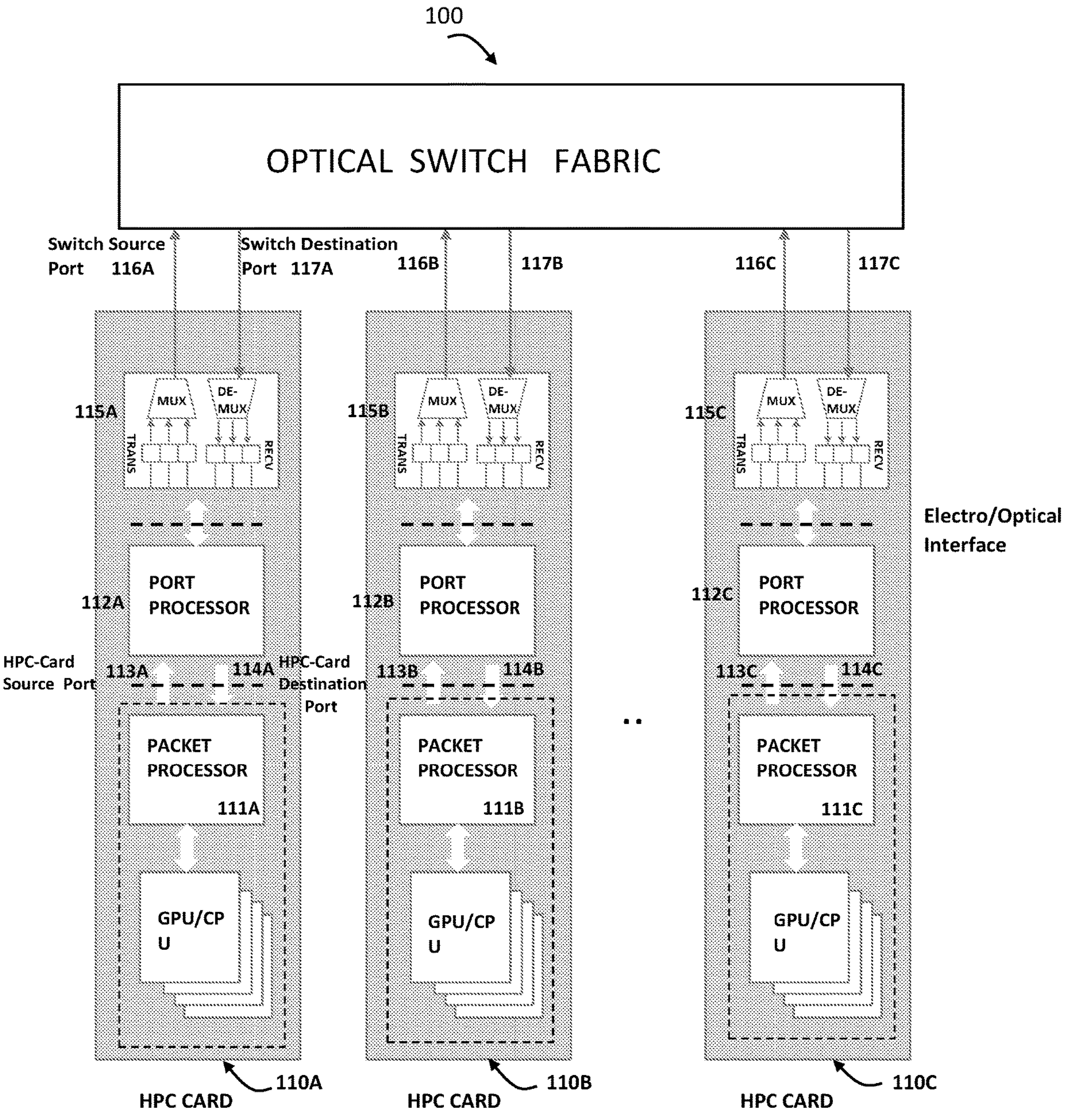
FIG. 1 is an exemplary HPCN with HPC cards connected by an optical switch fabric.
Figure 2:
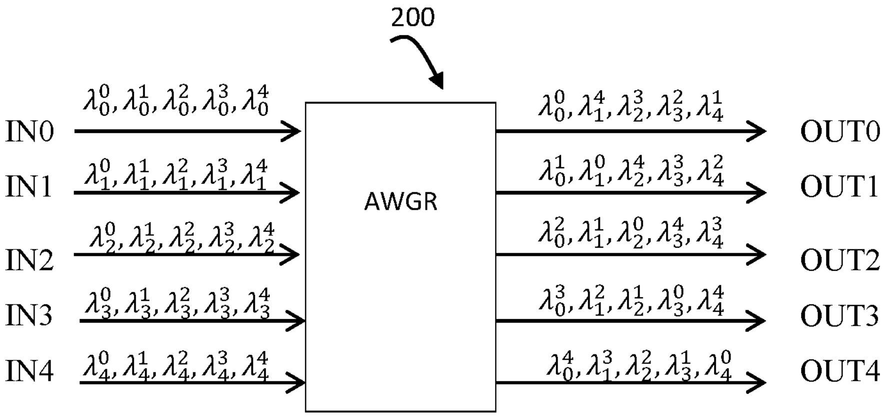
FIG. 2 is an N×N AWG operating on a set of N wavelengths $\{\lambda_0, \lambda_1, \ldots, \lambda_{N-1}\}$. Each input can transmit N wavelengths simultaneously.
Figure 3:
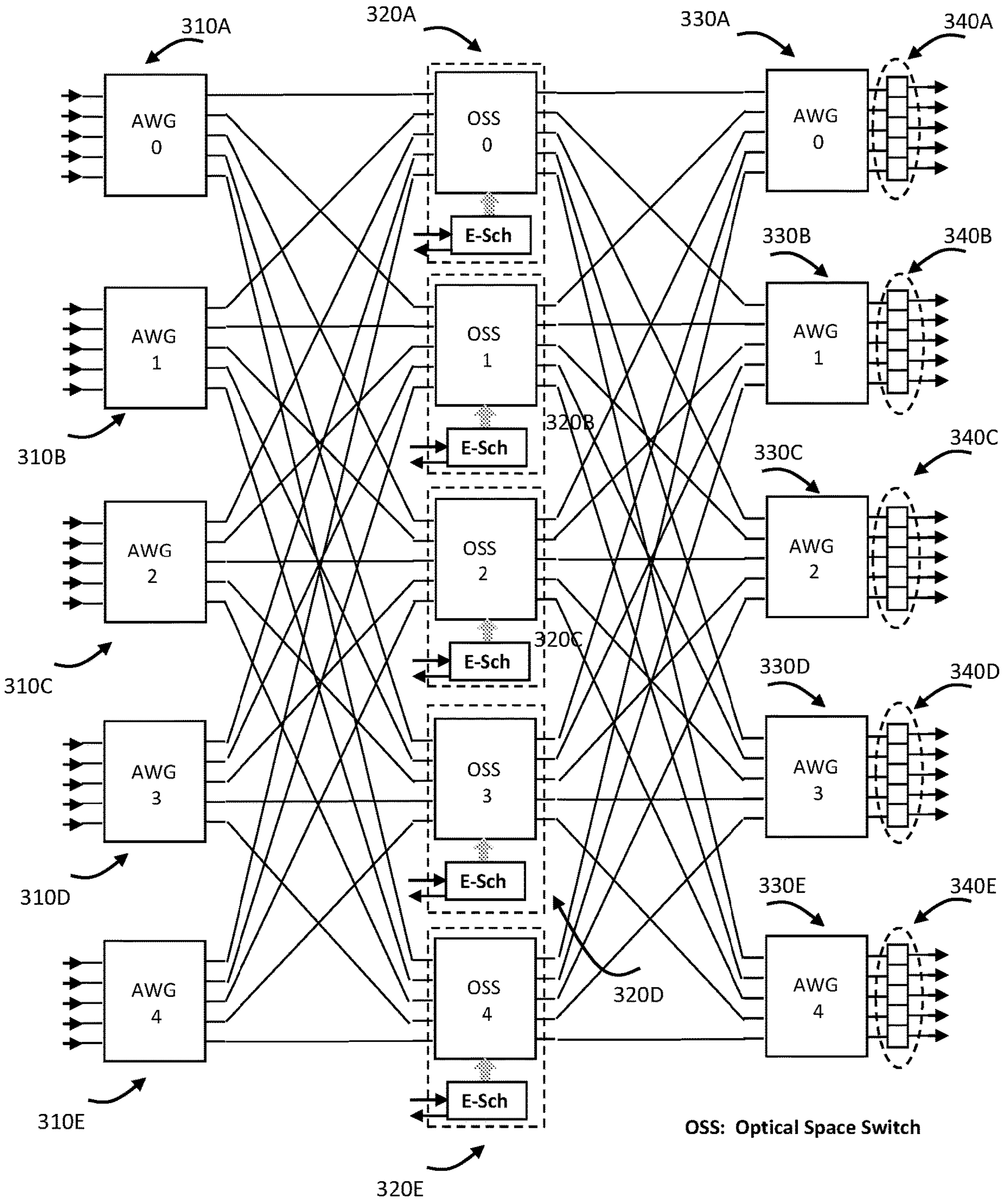
FIG. 3 is an ASA optical switch fabric. Each middle-stage OSS is controlled by an electronic scheduler. A separate network to link input port processors to schedulers is required.
Figure 4A:
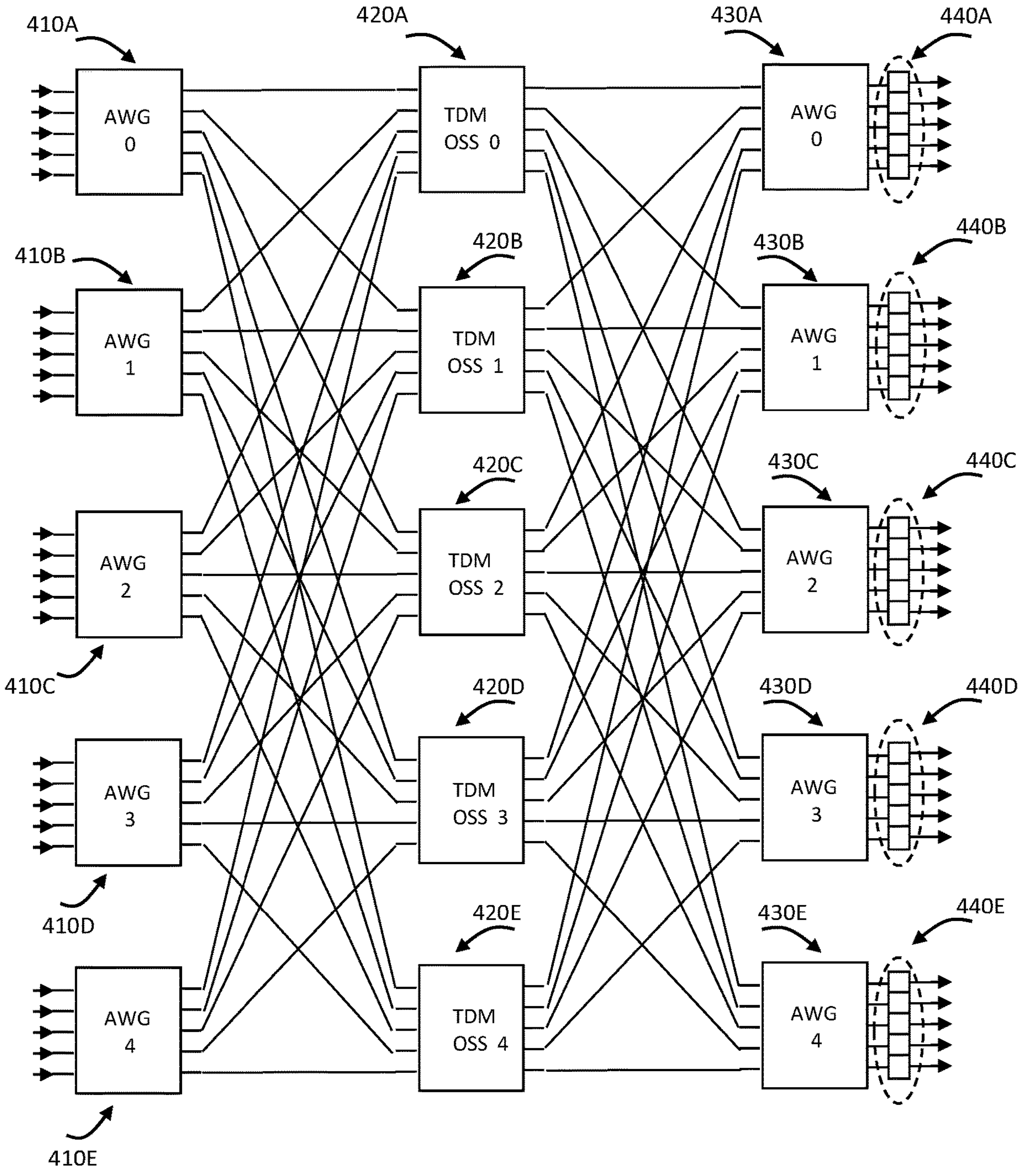
FIG. 4A is a TASA optical switch fabric. All space switches operate in a TDM mode and no electronic schedulers are required.
Figure 4B:
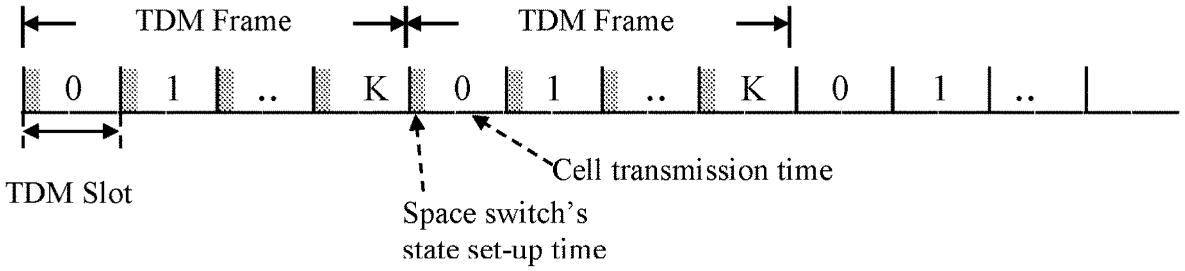
FIG. 4B shows the TDM frame structure of a TASA switch fabric.

The following describes a scalable AWG-based optical switch architecture in various exemplary embodiments. An optical switch fabric (e.g. 100 shown in FIG. 1) is used to interconnect multiple HPC (high performance computing) cards (e.g. 110A-110C). In addition to GPUs/CPUs, one main component on each HPC card is a packet processor (e.g. 111A-C) that processes the layer-2 or layer-3 interconnection protocols (such as InfiniBand or IP) of exchanged training packets generated by GPUs/CPUs. It then divides the packets into fixed-length cells and hands them over to a port processor (e.g. 112A) that routes the cells through the optical switch fabric 100 to their corresponding destination port processors (e.g. 112A-C). A destination port processor must re-sequence its received cells before sending them to its connected HPC card. Note that the switch fabrics presented below operate in a 'cell mode'. Cells and packets are used interchangeably hereinafter.

Although a port processor (e.g. 112A) is considered part of the switch fabric, it is typically integrated with a packet processor (e.g. 111A) on the same chip or in the same package. With today's advanced IC and packaging technology, the bandwidth of the interface (i.e. 113A-C/114A-C) between a packet processor and a port processor can easily exceed the bandwidth required to support a TE link. However, the per-wire bandwidth outside a chip is much lower, which is why WDM (wavelength division multiplexing) is necessary for transmitting packets between a HPC card (e.g. 110A) and the switch fabric 100. It's worth noting that there is a one-to-one correspondence between a HPC-Card Source Port (e g. 113A) and a switch source port (e.g. 116A) (or between 114A and 117A) in FIG. 1. Despite one being an electronic interface and the other an optical interface, they can be considered equivalent from a routing perspective.

Two embodiments of the optical switch fabric 100 are described below. The switch fabrics are named AS and SA for the technologies (i.e. AWG and Space Switching) used by the two switching stages of each switch fabric.

As Switch Fabric

An AS switch fabric comprises two stages of switching devices:

- the first stage comprising K N×N AWGs (e.g. 510A-E); and
- the second stage comprising N K×K OSSes (e.g. 520A-D).

Figure 5A:
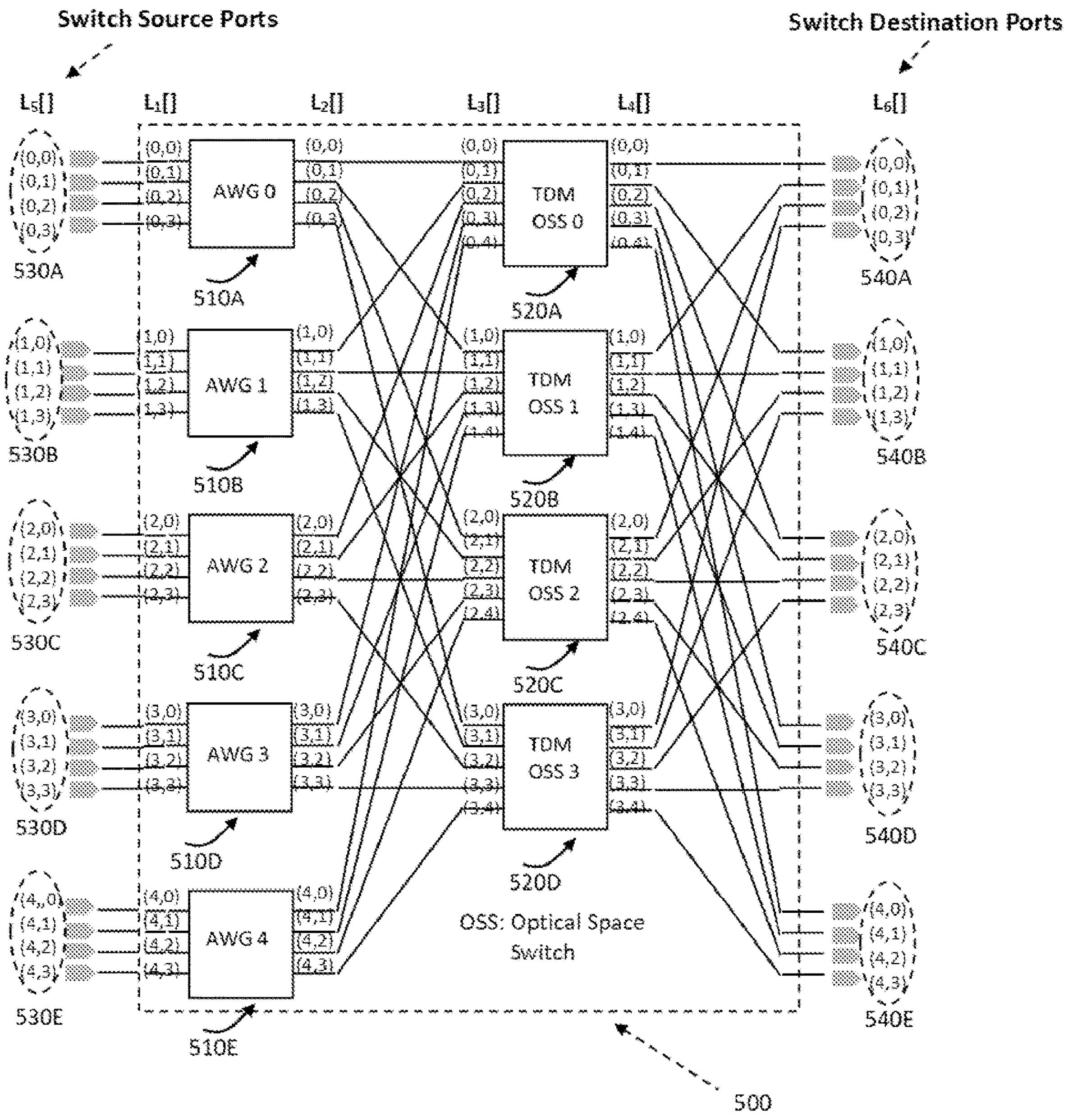
FIG. 5A is an exemplary implementation of the AS switch fabric with N=4 and K=5. The switch has only two stages of switching devices and its signal loss is much lower than in a three-stage TASA or ASA switch.

The total port count of an AS switch fabric equals KN. As K can be greater than N, the total port count can exceed $N^2$, which is the total port count of a TASA or ASA switch FIG. 5A shows an exemplary embodiment of an AS switch with K=4 and N=5.

How the two switching stages are connected in an AS switch fabric is described below. It is a crucial element in our invention. Each input/output link of an AWG or an OSS is assigned a two-tuple address [group, member], where group refers to the link's connected switching device (i.e. AWG or OSS) and member refers to the link number within the switching device for the input/output link. Let $L_1$[ ] and $L_2$[ ] denote the set of input and output links of the first-stage AWGs. For example, $L_1$[i,k] refers to the k-th input link of the i-th AWG, where $0 \le k \le N-1$ and $0 \le i \le K-1$. Let $L_3$[ ] and $L_4$[ ] denote the set of input and output links of the OSSes in the $2^{nd}$ stage (see FIG. 5A). Additionally, each HPC card is connected to the AS switch fabric through a switch-source port (e.g. 116A) and a switch-destination port (e.g. 117A). We also assign a two-tuple address to each of the two ports as follows. The switch-source port connected to $L_1$ [x,y] (i.e. input-link [x,y] of first-stage AWGs) is assigned the address [x,y]. A switch-destination port is assigned the same address as its corresponding switch-source port. Let $L_5$[ ] and $L_6$[ ] denote the set of switch source ports (e.g. 116A-C) and switch destination ports (e.g. 117A-C) respectively. Then the topology of the AS switch fabric in FIG. 5A is determined by the connectivity between $L_5$[ ] and $L_1$[ ], $L_2$[ ] and $L_3$[ ], and $L_4$[ ] and $L_6$[ ] as shown below:

$$L_5[i,j] \xrightarrow{(connected\ to)} L_1[i,j] \quad (1)$$
$$L_2[i,j] \xrightarrow{(connected\ to)} L_3[j,i]$$
$$L_4[i,j] \xrightarrow{(connected\ to)} L_6[j,i].$$

Figure 5B:
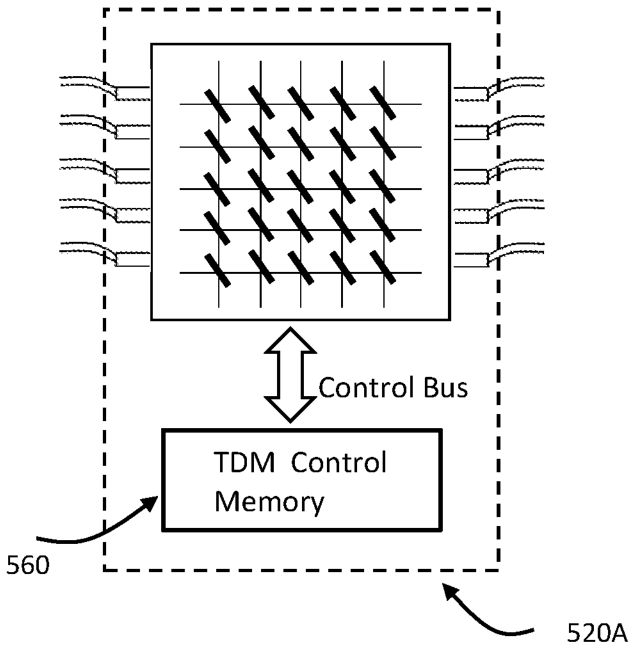
FIG. 5B is an exemplary implementation of a TDM OSS (optical space switch). Its connection patterns are stored inside its control memory.
Figure 5C:
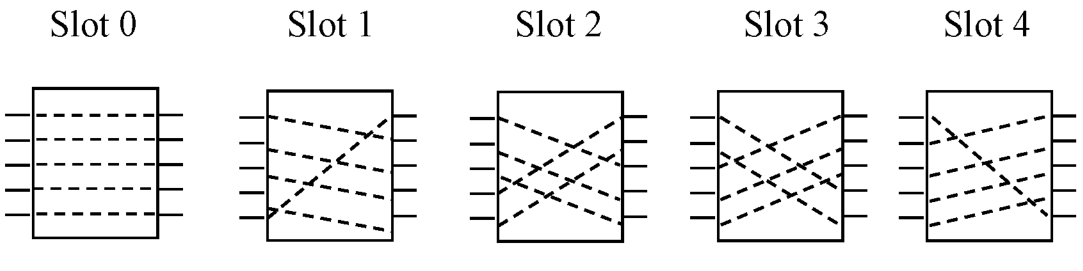
FIG. 5C shows the five connection patterns used by the switch in FIG. 5A.

Let all OSSes operate in a TDM mode (with the frame size=K). The connection patterns used by an OSS in each slot of a TDM frame are stored in its control memory (e.g. 560 in FIG. 5B). In a given slot, the OSS reads out the connection pattern and use the pattern to configure the OSS. No schedulers are required. Assume that all OSSes use the same connection pattern in a TDM slot. There are many ways to design such a connection pattern. An exemplary, non-limiting embodiment is given by the following formula:

$$\varphi(j) = (j+s)\mathrm{mod}K, \quad (2)$$

where j is an input of an OSS, φ(j) its connected output, and s the given TDM slot. Since s ranges from 0 to K−1, there are K connection patterns in total. FIG. 5C shows the five connection patterns defined by (2) for the AS switch in FIG. 5A.

The connection patterns of (2) and the switch's topology described by (1) result in the following connectivity for the entire switch:

In a TDM slot, all source ports of a source-port group are connected to destination ports belonging to one destination port group.

This can be seen by examining how a link $L_2$[i,j] is connected to a destination port in $L_6$[ ] in a given TDM slot s:

$$L_2[i,j] \xrightarrow{(Eq.\ 1)} L_3[j,i] \xrightarrow{(Eq.\ 2)} L_4[j,(i+s)\mathrm{mod}K] \xrightarrow{(Eq.\ 1)} L_6[(i+s)\mathrm{mod}K, j] \quad (3)$$

(note: "⟶" means "connected to")

Figure 5D:
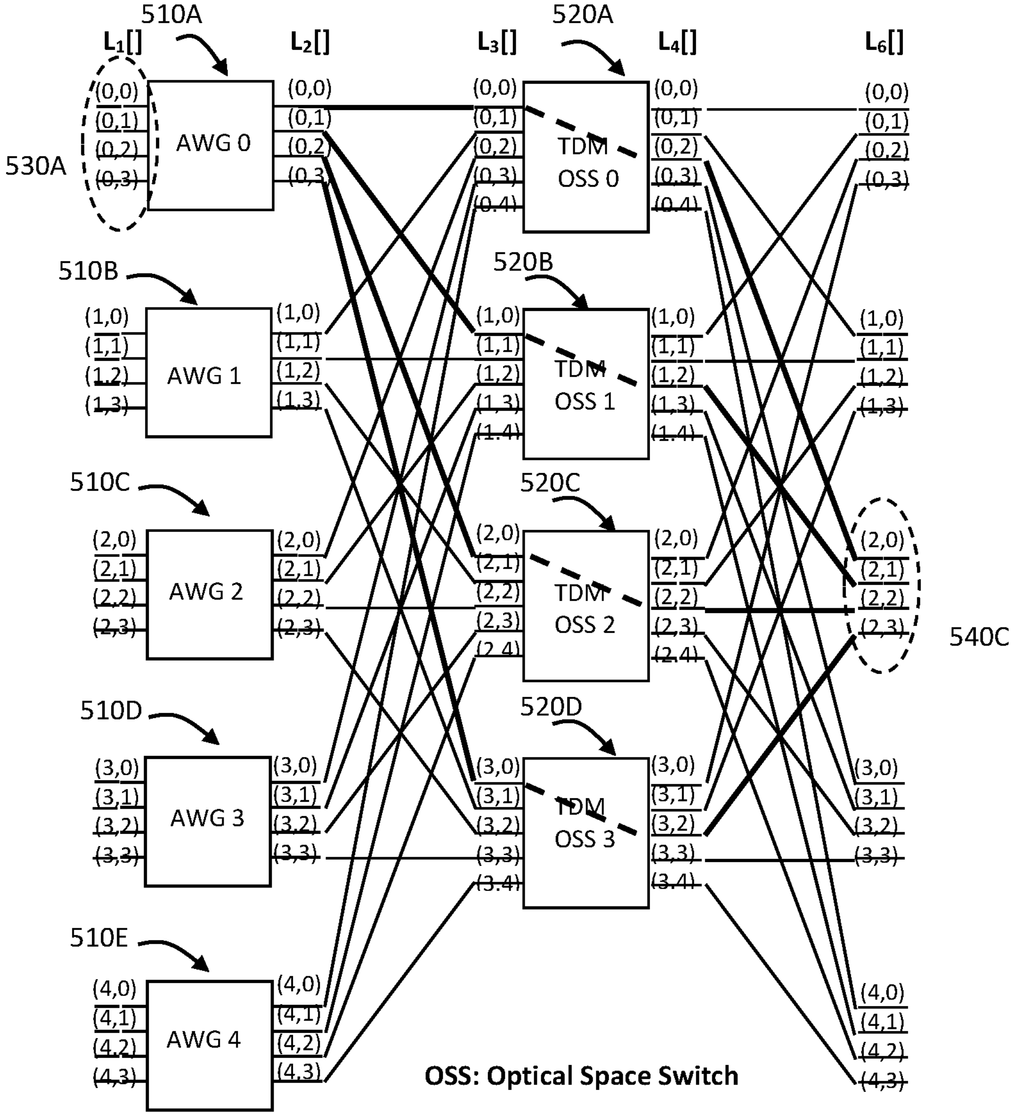
FIG. 5D shows that in each TDM slot, a source-port group is connected to only one destination-port group.
Figure 5E:
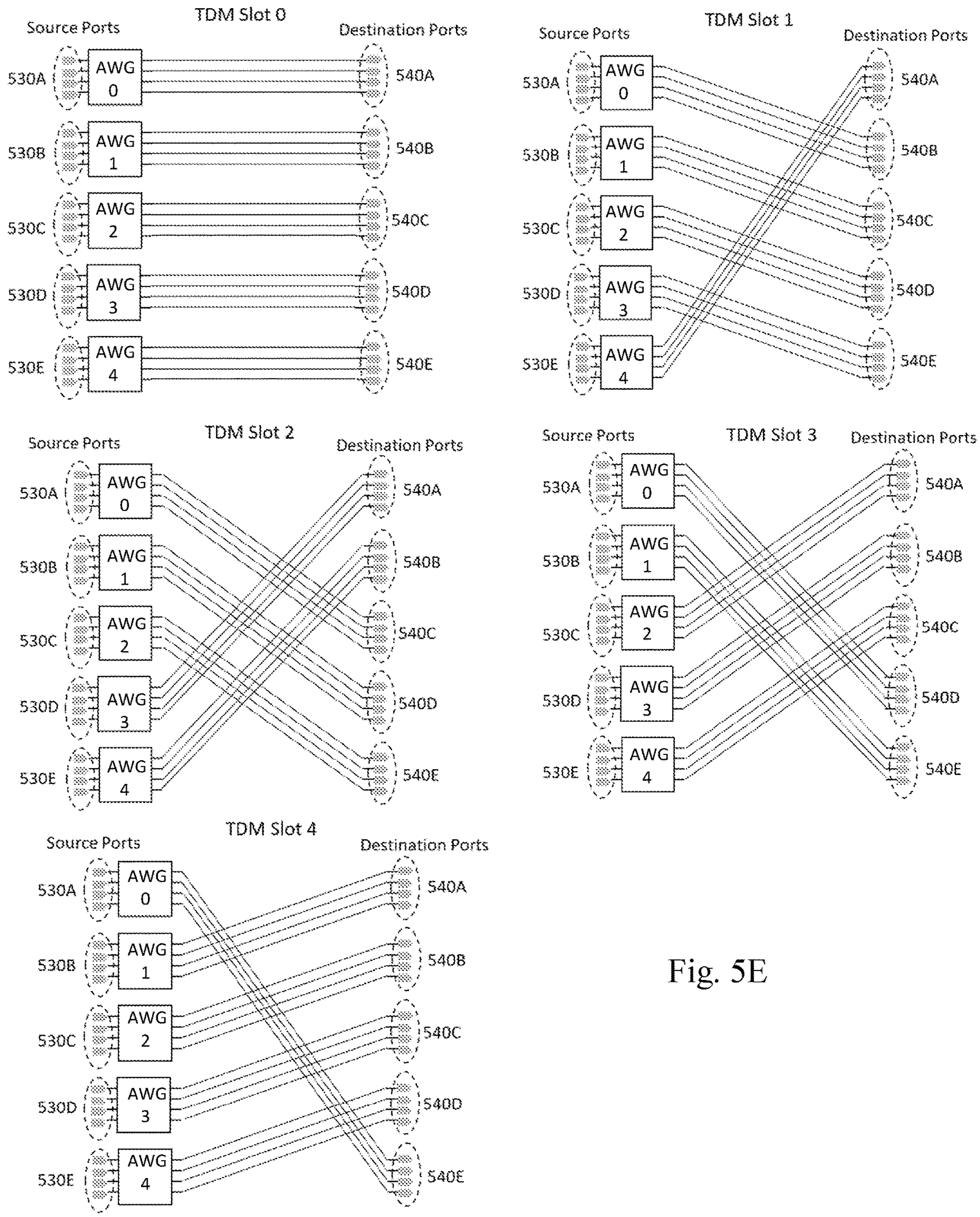
FIG. 5E shows that in each TDM slot, the entire switch is decoupled into K slices. Each slice contains a source-port group, a destination-port group, plus one AWG connecting the two groups. The figure shows that how a source-port group is connected to all destination-port groups in a round robin fashion.

We can see in (3) that the group value of the connected port depends only on i, not j. If we fix i and only change j in $L_2$[i,j], all the connected destination ports in (3) belong to the same group. This implies that a source-port group will only be connected to a destination port group in a TDM slot (see FIG. 5D) and the entire switch is decoupled into K independent slices. Each slice comprises a source-port group, a destination-port group, plus one AWG interconnecting the two groups (see FIG. 5E). As the time slot changes, a source-port group (e.g. 530A) will be connected to destination-port groups (e.g. 540A-E) in a round robin fashion. Note that in each TDM slot, $KN^2$ cells can pass through the switch without blocking.

As with any TDM switch, an AS switch fabric operating in a TDM mode can experience performance issues if traffic is not distributed evenly. To address this problem, we propose a switching system that utilizes two AS fabrics in parallel. More details are given below in the section titled "PORT PROCESSOR AND TWO-PHASE SWITCHING" below.

An AS switch fabric has several advantages over a TASA or an ASA switch fabric. First, it is more scalable, with a total port count (=KN) that can exceed $N^2$ (since K' can be easily made larger than N). Second, it has only two stages of switching devices, making it more cost-effective to implement than the TASA switch, which has three stages. Third, signal loss is reduced by at least 10 dB in the AS switch fabric due to the two-stage switching design, eliminating the need for optical amplifiers (e.g. 340A-E and 440A-D) which are necessary in an ASA and a TASA switch. Finally, only one N×N AWG is located between a source-port group and a destination-port group in a given TDM slot (see FIG. 5E). Whether Nis even or odd no longer matters and the AS switch fabric can use commercially available AWGs which are usually even-sized. In contrast, N must be odd in a TASA or an ASA switch and the AWGs used for them must be custom made.

SA Switch Fabric

Figure 6A:
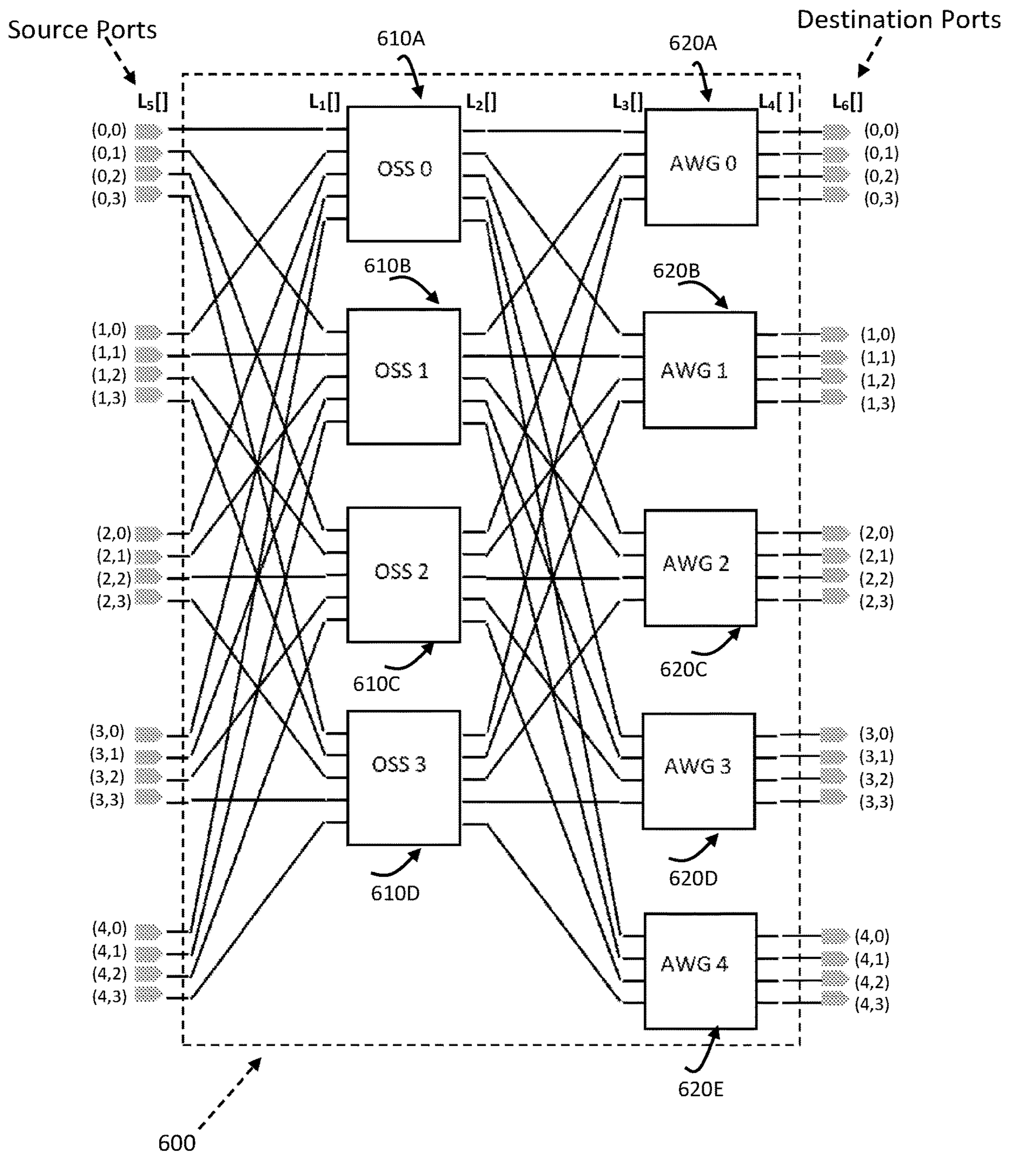
FIG. 6A is an exemplary implementation of the SA switch fabric with K=5 and N=4.

We can apply a similar principle to design an SA (Space Switching-AWG) switch fabric as illustrated in FIG. 6A It also consists of two stages:

the first stage comprises N K×K OSSes, and the second stage comprises K N×N AWGs.

FIG. 6A is an example with K=4 and N=5. The design principles of an SA switch fabric are summarized as follows:

(i) Its topology can be described by a formula as shown below:

$$L_5[i,j] \xrightarrow{(connected\ to)} L_1[j,i] \quad (4)$$
$$L_2[i,j] \xrightarrow{(connected\ to)} L_3[j,i]$$
$$L_4[i,j] \xrightarrow{(connected\ to)} L_6[i,j]$$

(note: the definitions of $L_1[]$ – $L_6[]$ are exactly the same as given in the *AS* architecture)

(ii) Its OSSes operate in a TDM mode and the connection patterns follow that of (2)

Figure 6B:
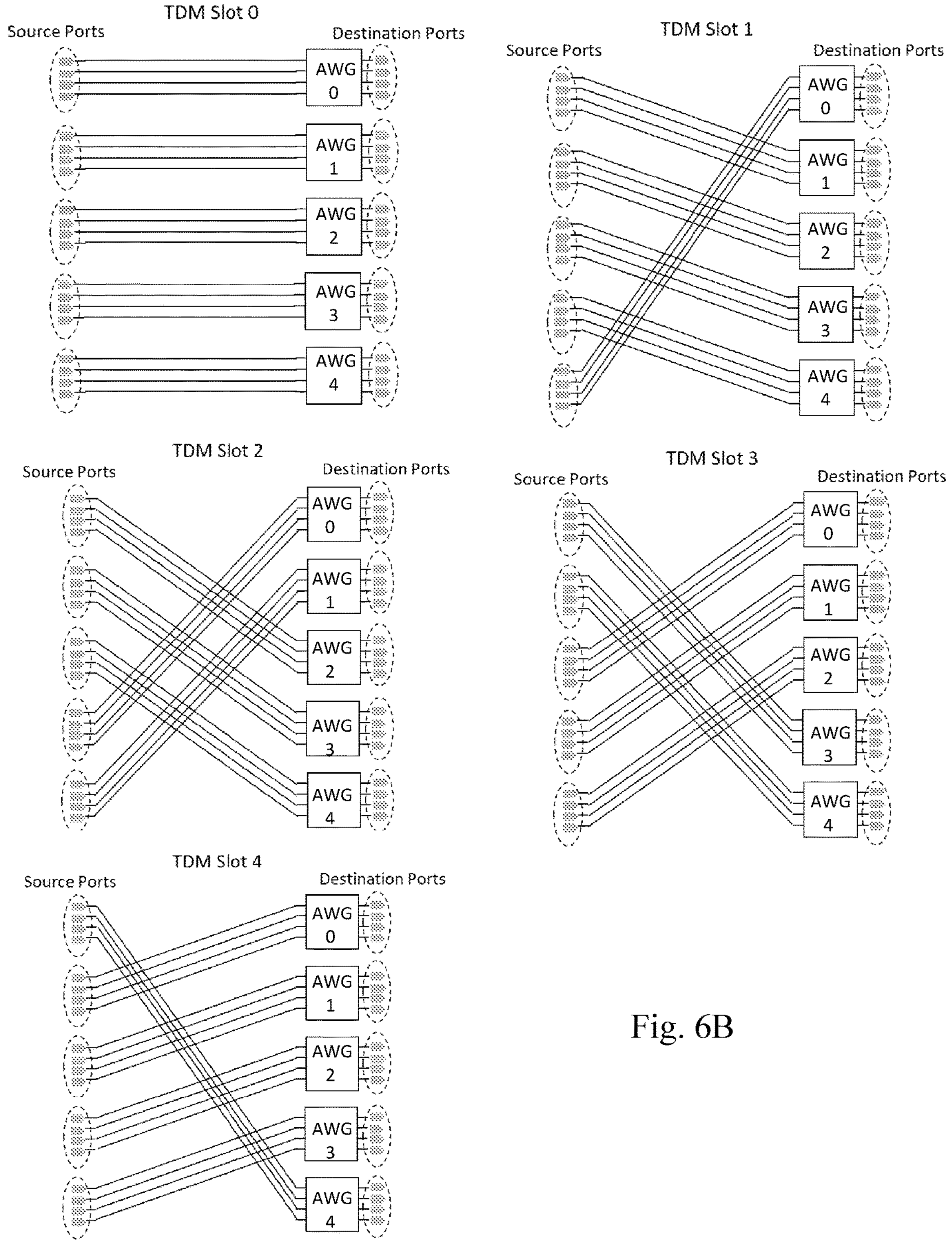
FIG. 6B shows that in a TDM slot, the SA switch fabric is decoupled into K slices (where K=5 in FIG. 6B). Each slice contains a source-port group, a destination-port group, plus one AWG connecting the two groups.

(iii) An SA switch has a group-to-group connectivity similar to that in an AS switch. The entire switch fabric is decoupled into K slices, as shown in FIG. 6B, in a TDM slot.

Compared to a TASA or an ASA switch fabric, an SA switch fabric offers advantages similar to those of the AS architecture, including: (a) improved scalability; (b) lower implementation costs due to the use of only two stages of switching devices; (c) the elimination of optical amplifiers; and (d) the ability to use commercially available, even-sized AWGs.

Two-Phase Switching and Port Processor

Figure 7A:
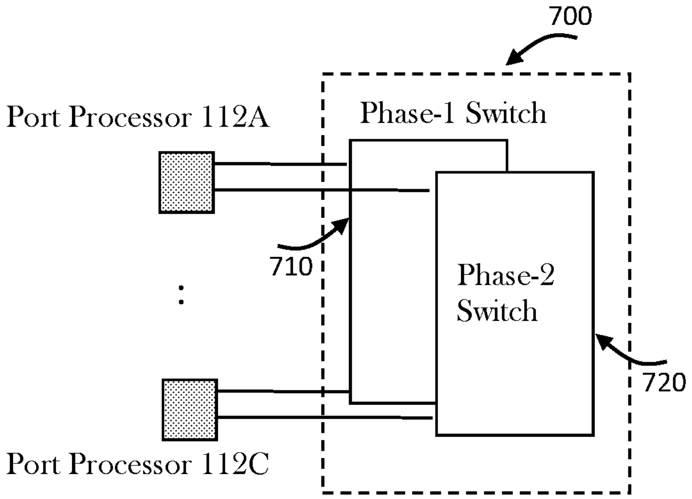
FIG. 7A shows a two-phase switching system. The phase-1 switch fabric is to create an evenly distributed load for the second switch fabric. This approach can lead to a bounded delay while the conventional approach shown in FIG. 7B cannot.

TDM switch fabrics, as already mentioned, can suffer from poor performance when traffic is unevenly distributed. To address this issue, we have developed a two-phase switching system 700 (see FIG. 7A) that utilizes two switch fabrics 710 and 720, both operating in TDM mode. These switch fabrics can be implemented using either an AS (e.g. 500) or an SA (e.g. 600) switch fabric. The switching process in 700 occurs in two phases. In phase 1, cells pass through 710 and are distributed to its outputs in a round-robin fashion, creating an evenly distributed traffic load for 720. In phase 2, cells are routed through 720 to their original destinations. Since cells may be transmitted out of sequence in the phase-1 switch 710, cell re-sequencing is a required task for the phase-2 switch 720.

Figure 7B:
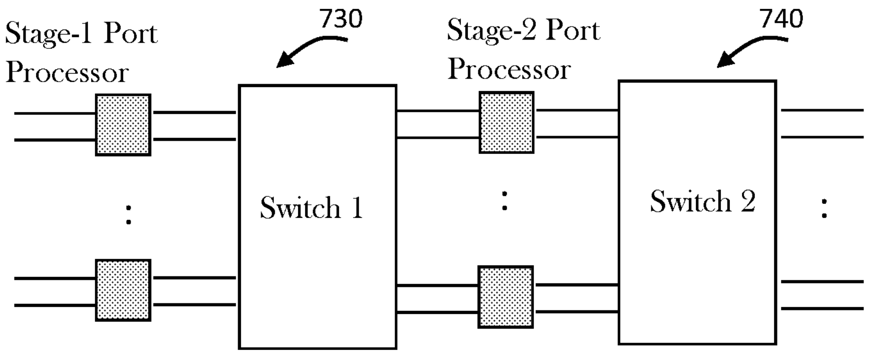
FIG. 7B is the conventional approach for tackling the unbalanced load problem. It cascades two TDM switch fabrics.
Figure 8:
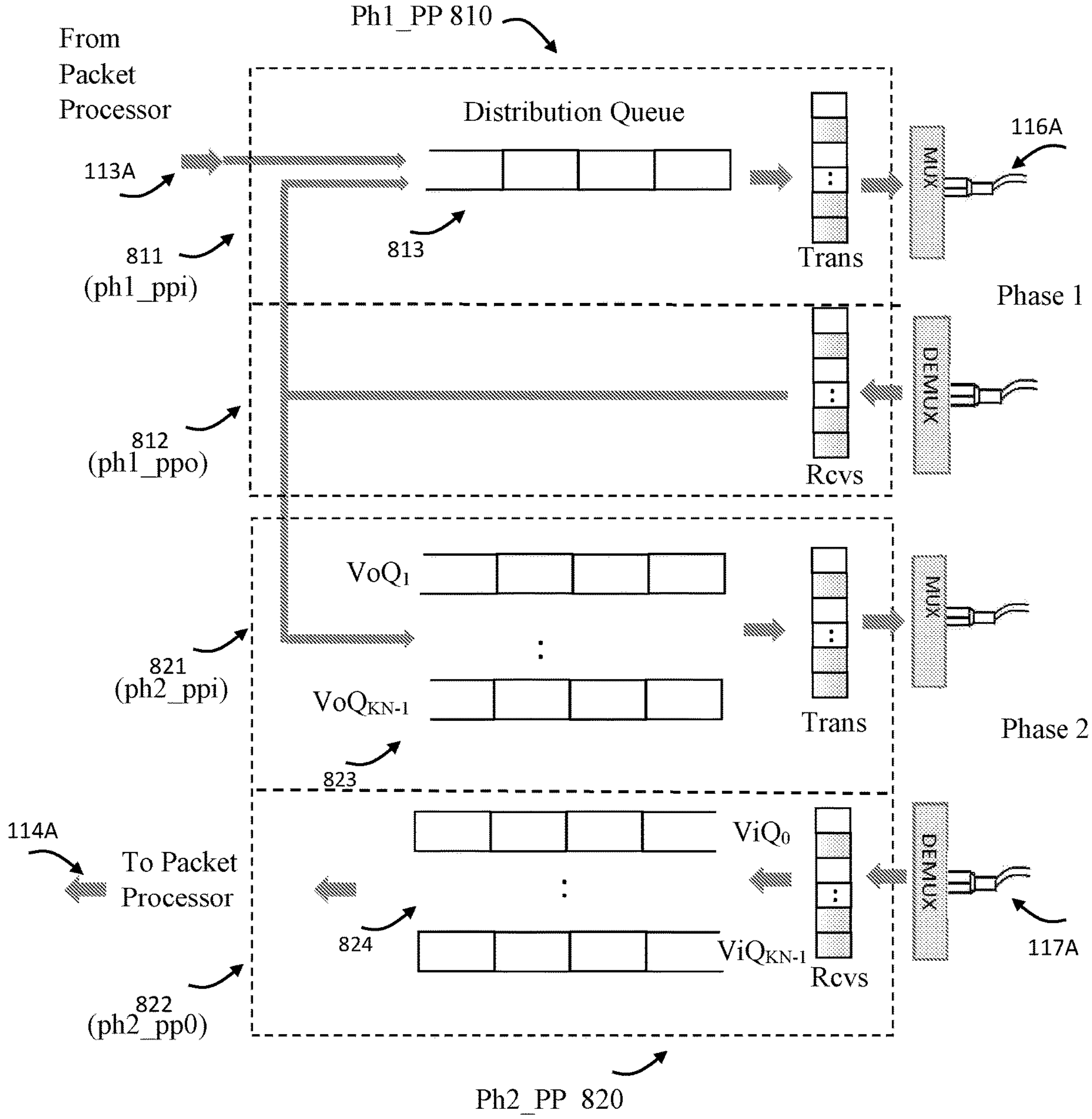
FIG. 8 is an exemplary embodiment of the port processor 112A for the two-phase switch of FIG. 7A.

It is worth noting that the two-phase switching system presented above differs from the conventional cascading approach depicted in FIG. 7B, which uses two TDM switches in series. Although the functions performed by 710/720 in FIG. 7A and 730/740 in FIG. 7B are similar, the architecture in FIG. 7A has a major advantage it allows for the integration of the port processors of both the phase-1 and the phase-2 switch fabrics into a single chip. This integration, as illustrated below, results in a bounded delay and simplifies the cell re-sequencing task.

To accommodate the two switch fabrics 710 and 720 in one switching system 700, the port processor 112A (or 112B, 112C) comprises two port processors 810 and 820, one for each switch fabric. The two port processors are integrated into the same chip so that they can exchange cells, which is crucial for achieving a bounded delay for the entire switch 700. Each port processor 810 (or 820) can be further divided into two component processors: input/output port processors 811/812 (or 821/822). Their functions are described below:

ph1_pp 810 (the port processor of the phase-1 switch):

- ph1_ppi (e.g. 811): The input processor of the ph1_pp (e.g. 810). It receives cells from a HPC-card's source port (e.g. 113A) and distributes them to the outputs of the phase-1 switch (e.g. 710) in a round-robin fashion.
- ph1_ppo (e.g. 812): The output processor of the ph1_pp (e.g. 810). It hands over received cells either to the ph2_ppi (e.g. 821) or back to the ph1_ppi (e.g. 811) (see discussions below).

ph2_pp 820 (the port processor of the phase-2 switch).

- ph2_ppi (e.g. 821): The input processor of the ph2_pp (e.g. 820). It routes cells through the phase-2 switch (e.g. 720) to their original destination ports.
- ph2_ppo (e.g. 822): The output processor of the ph2_pp (e.g. 820). It re-sequences cells, received from the phase 2 switch (e.g. 720), before sending them to the connected HPC card.

Figure 9:
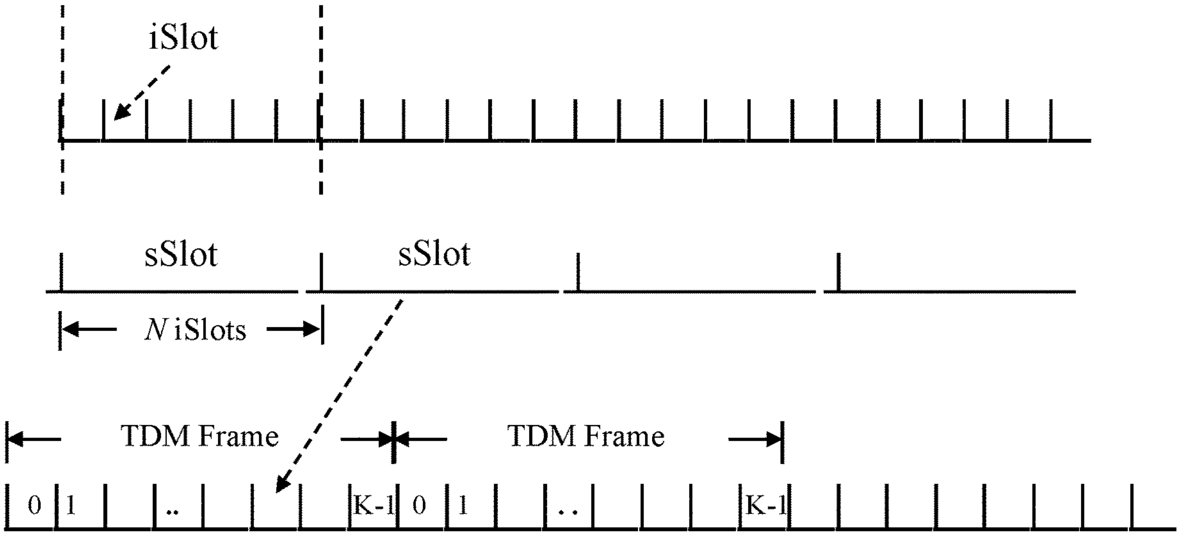
FIG. 9. shows the sizes of an sSlot and an iSlot.

The data rate of a future TE link can reach several terabits per second. This rate determines the cell transmission time, denoted by iSlot, inside a port processor (e.g. 112A) and all of its component processors (i.e. 811, 812, 821, and 822) must operate at the iSlot time-scale, processing cells at a rate one-cell/iSlot. WDM must be used to transmit data between an HPC card and the optical switch fabric. Assuming N wavelengths are used, then the per-wavelength data transmission rate is I/N the rate of a TE link, which determines the cell transmission time, denoted by sSlot, of one wavelength. Switch fabric 710 or 720 operates at the sSlot time scale. It is clear that the equation sSlot=N iSlots, as shown in FIG. 9, must bold.

Each cell transmitted in the switch contains a header that carries various pieces of information, including three essential ones:

- source port address: This is the input address of the phase-1 switch.
- destination port address: This is the output port address of the phase-2 switch.
- sequence number: This refers to the arriving time slot number (in iSlots) of a cell.

It is treated as the cell arrival time.

When a cell arrives from a packet processor (e.g. 113A), it is placed into a single Distribution Queue (DQ) (e.g. 813). The ph1_ppi can take N cells from the DQ in one sSlot and distributes them to the outputs of the phase-1 switch. When a cell reaches an output of the phase-1 switch, the ph1_ppo (e.g. 812) passes it to the ph2_ppi (e.g. 821), which puts the cell into a queue containing all cells destined for the same output port. This queue is traditionally known as a Virtual Output Queue (VOQ), and since there are KN destination ports, there will be KN VOQs (e.g. 823) in the ph2_ppi. VOQs are served in a round-robin fashion, and each VOQ is served only once in a frame (i.e., K TDM slots). In contrast, there is a single DQ, which means that the DQ is served at a rate KN times that of a VOQ. Consequently, the delay, denoted by Ph1Delay, of the phase-1 switch is much smaller than the delay, denoted by Ph2Delay, of the phase-2 switch. To derive the delay bound, denoted by Ph12DB, of the switch, we should focus on the Ph2Delay first.

To bound Ph2Delay, we limit the length of each VOQ to a specified value a. As a result, the Ph2Delay is bounded by (α×frame size). When a cell arrives at the ph1_ppo (e.g. 812), if the length of the corresponding VOQ has already reached a, the ph2_ppi will instruct ph1_ppo to hand the cell back to the ph1_ppi (e.g. 811) co-located in the same chip. The cell will then pass through the phase-1 switch 710 again and get distributed to a different output. This lookback scheme implies that a cell will pass through the phase-1 switch multiple times. Although the Ph1Delay is small, we still need to limit the number of loopback times (which is recorded in a cell's header) to bound the Ph1Delay. This is done by limiting the maximum loopback times to a specified value y. When this condition is violated, the ph1_ppi will discard the cell. It should be noted that our cell discarding scheme is based on loopback times, which is different from conventional timer-based packet discarding schemes (e.g. M. Sammour, et al, Method and apparatus for PCDP discard, U.S. Pat. No. 10,630,819, 2020).

Figure 10:
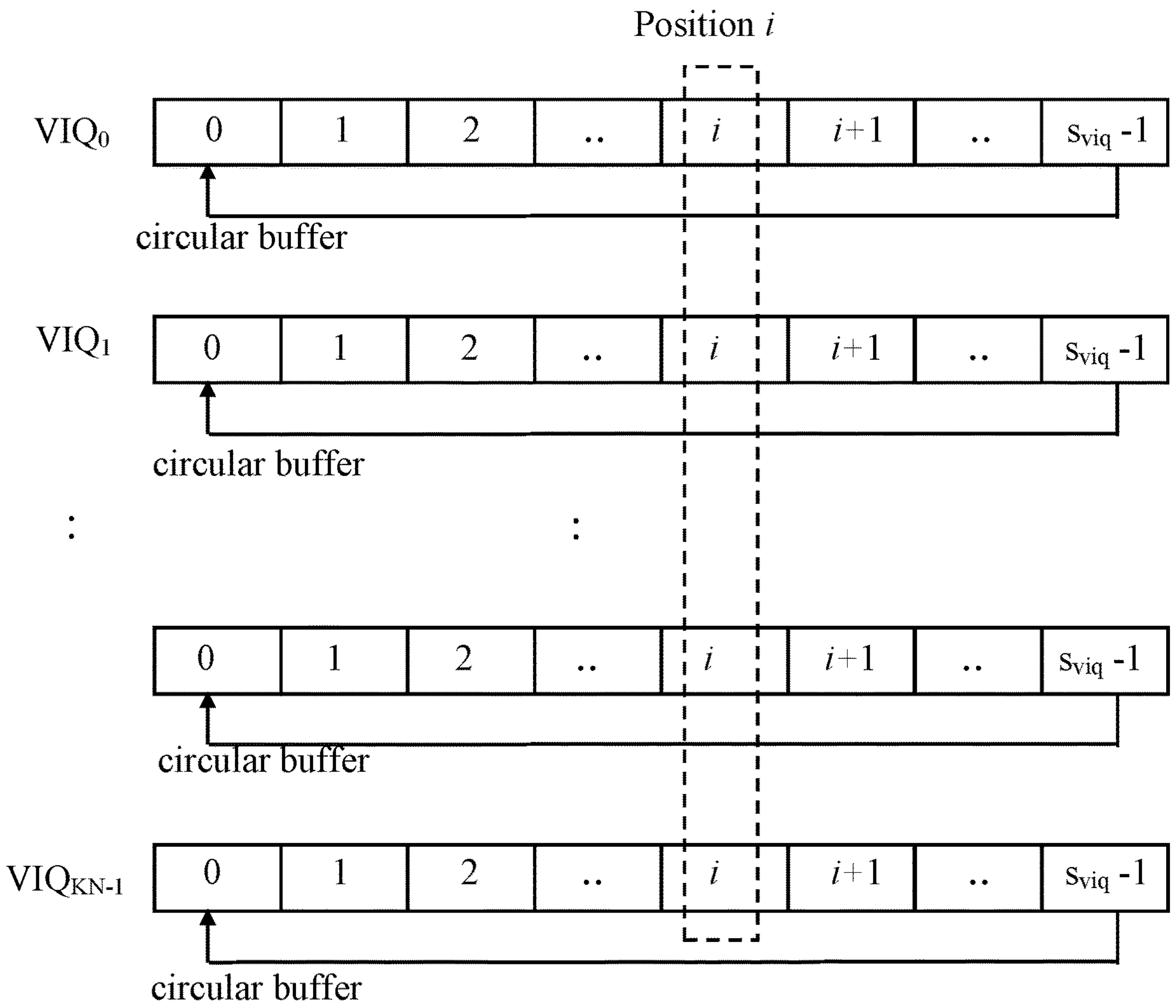
FIG. 10 illustrates how VIQs are used as cell resequencing buffers. Each VIQ is implemented as a circular buffer and VIQ transmissions are position based.

Once the bounds for Ph1Delay and Ph2Delay are given, the value of Ph12DB can be derived. A bounded delay, as shown below, simplifies the cell re-sequencing task. Note that cell re-sequencing is done for each source port. When a cell is received, the ph2_ppo places it into a queue, traditionally called a Virtual Input Queue (VIQ), containing cells with the same source port address. As there are KN source ports, there will be KN VIQs (e.g., 824) in the ph2_ppo. VIQs serve as cell-resequencing buffers in our design and are implemented as circular buffers (FIG. 10). The size of a VIQ, denoted by $s_{viq}$, should be larger than Ph12DB. When a cell arrives, the ph2_ppo inserts it into the following position of its VIQ:

$$(\text{sequence–number } \% \ s_{viq}),$$

where % is the mod operator. Therefore, VIQ entries of the same position are for cells having the same arrival time (i.e., the same sequence number). Selecting a VIQ for transmission is position-based (see FIG. 10). The ph2_ppo transmits all cells of the current position before moving to the next position (i.e., (position+1) mod $s_{viq}$). VIQs of the same position are selected in a round-robin way, and a VIQ having no cell stored in the current position is skipped in the selection process. Note that when a VIQ is selected, the condition $$\text{the current position} \leq (t_{current} - Ph12DB) \tag{5}$$

must be satisfied, where $t_{current}$ denotes the current time (in iSlots). This guarantees that if a VIQ has a cell belonging to the current position, the cell must have already arrived when the VIQ is selected. If no VIQs can satisfy the condition set by (5), the ph2_ppo temporarily suspends its VIQ selection. The selection process resumes when $t_{current}$ gets updated in the next iSlot. As shown above, the delay bound Ph12DB simplifies the selection task to just checking if (5) is satisfied or not.

The above cell resequencing scheme is simple and fast to implement. However, equipping each VIQ with $s_{viq}$ cells is wasteful because most slots in a VIQ are usually empty. In practice, we use a separate memory unit called VIQ Storage to store the bodies of cells. The VIQ Storage is a linked list shared by all VIQs, while each element in a VIQ contains only a pointer (several bytes) pointing to the cell location in the VIQ Storage. With this implementation, memory efficiency is no longer a concern.

Finally, it should be noted that various VIQ-based schemes have been proposed to maintain packet sequence in a buffered network in which cells can travel through different paths to reach their destination outputs. One example is given in "Park, et al, Maintain packet sequence using cell flow control, U.S. Pat. No. 7,688,816, 2010" which uses VIQs and flow control to maintain cell sequence in a buffered network. However, these methods do not apply to our two-phase switch, which uses two un-buffered switch fabrics in parallel.

What is claimed is:

1. A port processor for processing packets of a switching system comprising two switch fabrics, named phase-1 and phase 2, working in parallel, comprising:

a phase-1port processor connected to the phase-1 switch fabric, comprising a phase-1 input processor and a phase-1 output processor; and a phase-2 port processor connected to the phase-2 switch fabric, comprising a phase-2 input processor and a phase-2 output processor;

wherein the phase-1 input processor evenly distributes cells (fixed length packets) received from an external source port to the outputs of the phase-1 switch fabric;

the phase-1 output processor passes cells, received from the phase-1 switch fabric, either to the phase-2 input port processor or back to the phase-1 input port processor;

the phase-2 input processor receives cells from the phase-1 output processor and route the cells, through the phase-2 switch fabric, to the destination outputs of the cells;

the phase-2 output processor re-sequences cells, received from the phase-2 switch fabric, before sending them to an external port.

2. The port processor of claim 1, wherein the phase-2 input processor puts an arriving cell into a queue, called VOQ (virtual output queue), containing cells destined for the same destination output of the switch if the length of the VOQ is smaller than a given limit $\alpha$, or the phase-2 input processor will pass the cell back to the phase-1 input processor if the length of the VOQ equals the given limit $\alpha$.

3. The port processor of claim 1, wherein the phase-2 output processor puts an arriving cell into the position (sequence-number % $L_{viq}$) of a queue, called VIQ (virtual input queue), containing cells generated by the same source port, where sequence-number is the number of the time slot during which the cell arrives at the phase-1 input processor and $L_{viq}$ represents a VIQ's total number of storage cells.

* * * * *